(12) United States Patent
Kubota

(10) Patent No.: US 8,166,553 B2
(45) Date of Patent: Apr. 24, 2012

(54) METHOD AND APPARATUS FOR DETECTING UNAUTHORIZED-ACCESS, AND COMPUTER PRODUCT

(75) Inventor: Kazumi Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1018 days.

(21) Appl. No.: 10/972,436

(22) Filed: Oct. 26, 2004

(65) Prior Publication Data
US 2005/0086538 A1 Apr. 21, 2005

Related U.S. Application Data

(63) Continuation of application No. PCT/JP02/05148, filed on May 28, 2002.

(51) Int. Cl.
*G06F 7/04* (2006.01)
*G06F 17/30* (2006.01)
*H04N 7/16* (2011.01)

(52) U.S. Cl. .......... 726/26; 726/23; 726/24; 726/25; 726/5; 713/164; 713/188; 713/168; 705/38; 705/39

(58) Field of Classification Search .......... 713/189, 713/168
See application file for complete search history.

(56) References Cited

U.S. PATENT DOCUMENTS

| | | | | |
|---|---|---|---|---|
| 6,202,158 B1 * | 3/2001 | Urano et al. | ..... | 726/22 |
| 6,681,331 B1 * | 1/2004 | Munson et al. | ..... | 726/23 |
| 2002/0078381 A1 * | 6/2002 | Farley et al. | ..... | 713/201 |
| 2003/0051026 A1 * | 3/2003 | Carter et al. | ..... | 709/224 |
| 2003/0110396 A1 * | 6/2003 | Lewis et al. | ..... | 713/201 |
| 2003/0221123 A1 * | 11/2003 | Beavers | ..... | 713/201 |
| 2004/0205474 A1 * | 10/2004 | Eskin et al. | ..... | 715/500 |

FOREIGN PATENT DOCUMENTS

| | | |
|---|---|---|
| JP | 2000-124952 | 4/2000 |
| JP | 2000-261483 | 9/2000 |
| JP | 2002-015136 | 1/2002 |

* cited by examiner

*Primary Examiner* — Nathan Flynn
*Assistant Examiner* — Bryan Wright
(74) *Attorney, Agent, or Firm* — Fujitsu Patent Center

(57) ABSTRACT

An unauthorized-access detecting apparatus that detects unauthorized access to a server that provides a service via a network includes a storing unit that stores a series of process request, which is made by an unauthorized user via an unauthorized client, as an unauthorized-access event string; and a judging unit that compares a new process request with the unauthorized-access event string stored in the storing unit, and judges whether the process request is the unauthorized access based on a result of comparison.

21 Claims, 9 Drawing Sheets

FIG.2

| IP ADDRESS | CLIENT NAME | DATE OF REGISTRATION | DATE OF LAST ACCESS |
|---|---|---|---|
| 1.2.3.4 | — | 2001/1/1 | 2001/1/10 |
| 111.222.111.222 | a.b.c.or.jp | 2000/11/13 | 2001/1/12 |
| 100.200.255.255 | aaa.bbb.ccc.ne.jp | 2000/7/18 | 2000/11/13 |

FIG. 3

| ID | ACCESS DATE | EVENT NAME | SOURCE PORT NAME | TARGET PORT NAME | SOURCE | DESTINATION |
|---|---|---|---|---|---|---|
| 175006 | 19-Sep-00 | SNMP_Community | 923 | SNMP | 192.168.35.166 | 192.168.35.161 |
| 175007 | 19-Sep-00 | SNMP_Community | 923 | SNMP | 192.168.35.166 | 192.168.35.161 |
| 175008 | 19-Sep-00 | SNMP_Community | 923 | SNMP | 192.168.35.166 | 192.168.35.161 |
| 175009 | 19-Sep-00 | Smurf | | | 192.173.162.116 | 192.168.35.165 |
| 175010 | 19-Sep-00 | Email_Ehlo | 4338 | E-mail | 192.155.149.25 | 192.168.35.162 |
| 175011 | 19-Sep-00 | SNMP_Community | 923 | SNMP | 192.168.35.166 | 192.168.35.161 |
| 175012 | 19-Sep-00 | Email_Ehlo | 4575 | E-mail | 192.239.47.251 | 192.168.35.162 |
| 175013 | 19-Sep-00 | SNMP_Community | 923 | SNMP | 192.168.35.166 | 192.168.35.161 |
| 175014 | 19-Sep-00 | SNMP_Community | 923 | SNMP | 192.168.35.166 | 192.168.35.161 |
| 175015 | 19-Sep-00 | SNMP_Community | 923 | SNMP | 192.168.35.166 | 192.168.35.161 |
| 175016 | 19-Sep-00 | SNMP_Community | 923 | SNMP | 192.168.35.166 | 192.168.35.161 |
| 175017 | 19-Sep-00 | Email_Ehlo | 34303 | E-mail | 192.168.35.162 | 192.1681.1.135 |
| 175018 | 19-Sep-00 | FTP_Put | 25932 | FTP | 192.162.232.83 | 192.168.35.171 |
| 175019 | 19-Sep-00 | FTP_Put | 25932 | FTP | 192.162.232.83 | 192.168.35.171 |
| 175020 | 19-Sep-00 | Email_Ehlo | 34305 | E-mail | 192.168.35.162 | 192.164.9.98 |
| 175021 | 19-Sep-00 | SNMP_Community | 923 | SNMP | 192.168.35.166 | 192.168.35.161 |
| 175022 | 19-Sep-00 | Email_Ehlo | 34308 | E-mail | 192.168.35.162 | 192.168.37.132 |
| 175023 | 19-Sep-00 | SNMP_Community | 923 | SNMP | 192.168.35.166 | 192.168.35.161 |
| 175024 | 19-Sep-00 | SNMP_Community | 923 | SNMP | 192.168.35.166 | 192.168.35.161 |

FIG.8

| EVENT NUMBER | EVENT NAME | DEGREE OF SIGNIFICANCE |
|---|---|---|
| 1 | Arp | 10 |
| 2 | BackOrifice | 7 |
| 3 | Changes_to_important_files | 14 |
| 4 | Chargen_Denial_of_Service | 6 |
| 5 | Detector_Error | 5 |
| 6 | Detector_Warning | 6 |
| 7 | DNS_HInfo | 1 |
| 8 | DNS_Length_Overflow | 1 |
| 9 | DNS_Zone_High_Port | 48 |
| 10 | DNS_Zone_Transfer | 2 |

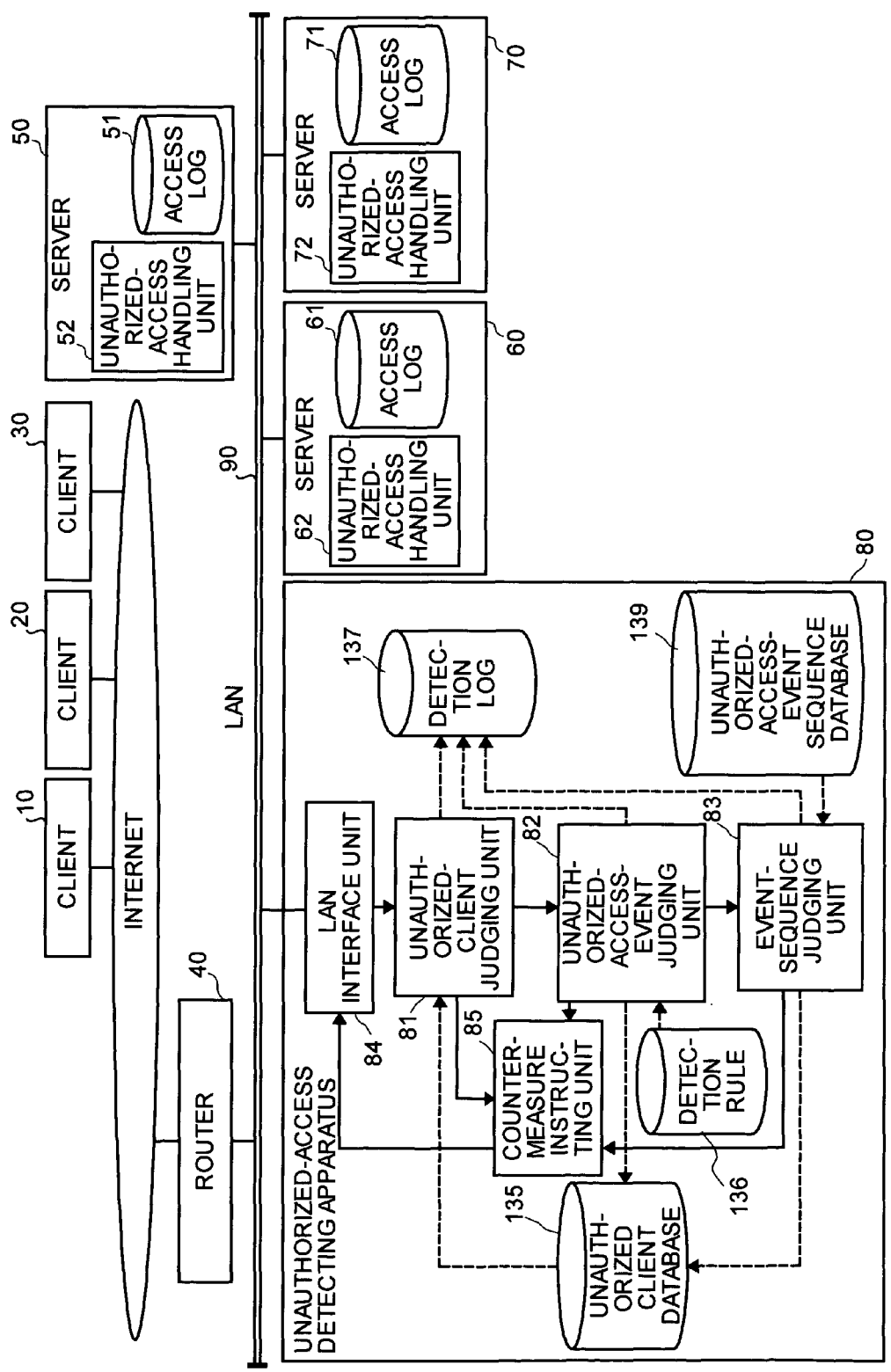

METHOD AND APPARATUS FOR DETECTING UNAUTHORIZED-ACCESS, AND COMPUTER PRODUCT

This application is a continuing application, filed under 35 U.S.C. §111(a), of International Application PCT/JP02/05148, filed May 28, 2002.

TECHNICAL FIELD

The present invention relates to a technology for detecting unauthorized access to a server that provides a service via a computer network.

BACKGROUND ART

With a recent advance of network technology and rapidly expanded use of the world wide web (WWW) as a distribution system on the Internet, servers that provide various services are increasing at a considerable pace. At the same time, unauthorized access is also increasing rapidly with the increase of such servers.

To cope with a problem of the unauthorized access, an unauthorized-access detecting tool to detect the unauthorized access is currently in use. The unauthorized-access detecting tool adopts a detection rule for detecting an unauthorized process request from a client, with which the unauthorized-access detecting tool detects an unauthorized access by comparing the detection rule and the process request from the client. For example, the detection rule includes detecting a homepage access request with an extremely long URL that does not actually exist, a collation request of an extremely long character string that is meaningless, an input of an incorrect password, and the like.

However, in the conventional technology for judging unauthorized access, a judgment for the unauthorized access is performed for each of the process requests, and it may cause many cases in which the judgment between a proper access and an improper access cannot be made. For example, it is impossible to judge whether an improper password is an attempt for the unauthorized access, or simply a mistake in inputting the password by an authorized user.

If all of the input of the incorrect password is judged as the unauthorized access, there will be many detection mistakes such as judging the authorized access as the unauthorized access. On the other hand, if all of the input of the incorrect password is judged not to be the unauthorized access, the unauthorized access cannot be detected until actual intrusion and attack occur.

There is an unauthorized-access judging technology in which index of server load condition and the like are monitored, and when a value of the index deviates from acceptable values, it is judged that there is the unauthorized access. However, in this unauthorized access judging technology, it is difficult to determine the acceptable values of the index.

DISCLOSURE OF THE INVENTION

It is an object of the present invention to solve at least the above problems in the conventional technology.

An unauthorized-access detecting apparatus according to one aspect of the present invention includes a storing unit that stores a series of process request, which is made by an unauthorized user via an unauthorized client, as an unauthorized-access event string; and a judging unit that compares a new process request with the unauthorized-access event string stored in the storing unit, and judges whether the process request is the unauthorized access based on a result of comparison.

An unauthorized-access detecting method according to another aspect of the present invention includes storing a series of process requests as an unauthorized-access event string, the process requests made by an unauthorized user via an unauthorized client; comparing a new process request with the unauthorized-access event string stored, and judging whether the new process request is the unauthorized access based on a result of comparison.

A computer-readable recording medium according to still another aspect of the present invention stores a computer program for detecting an unauthorized-access according to the above aspect.

BRIEF DESCRIPTION OF THE DRAWINGS

FIG. 2 is a table for explaining an example of an unauthorized client database;

FIG. 3 is a table for explaining an example of a detection log;

FIG. 8 is a table for explaining an example of a detection event master table; and FIG. 9 is a block diagram of an unauthorized-access detecting system according to a second embodiment of the present invention.

BEST MODE FOR CARRYING OUT THE INVENTION

Exemplary embodiments of an unauthorized-access detecting apparatus, an unauthorized-access detecting method, and a computer product according to the present invention will be explained in detail below with reference to the accompanying drawings.

Figure 1:
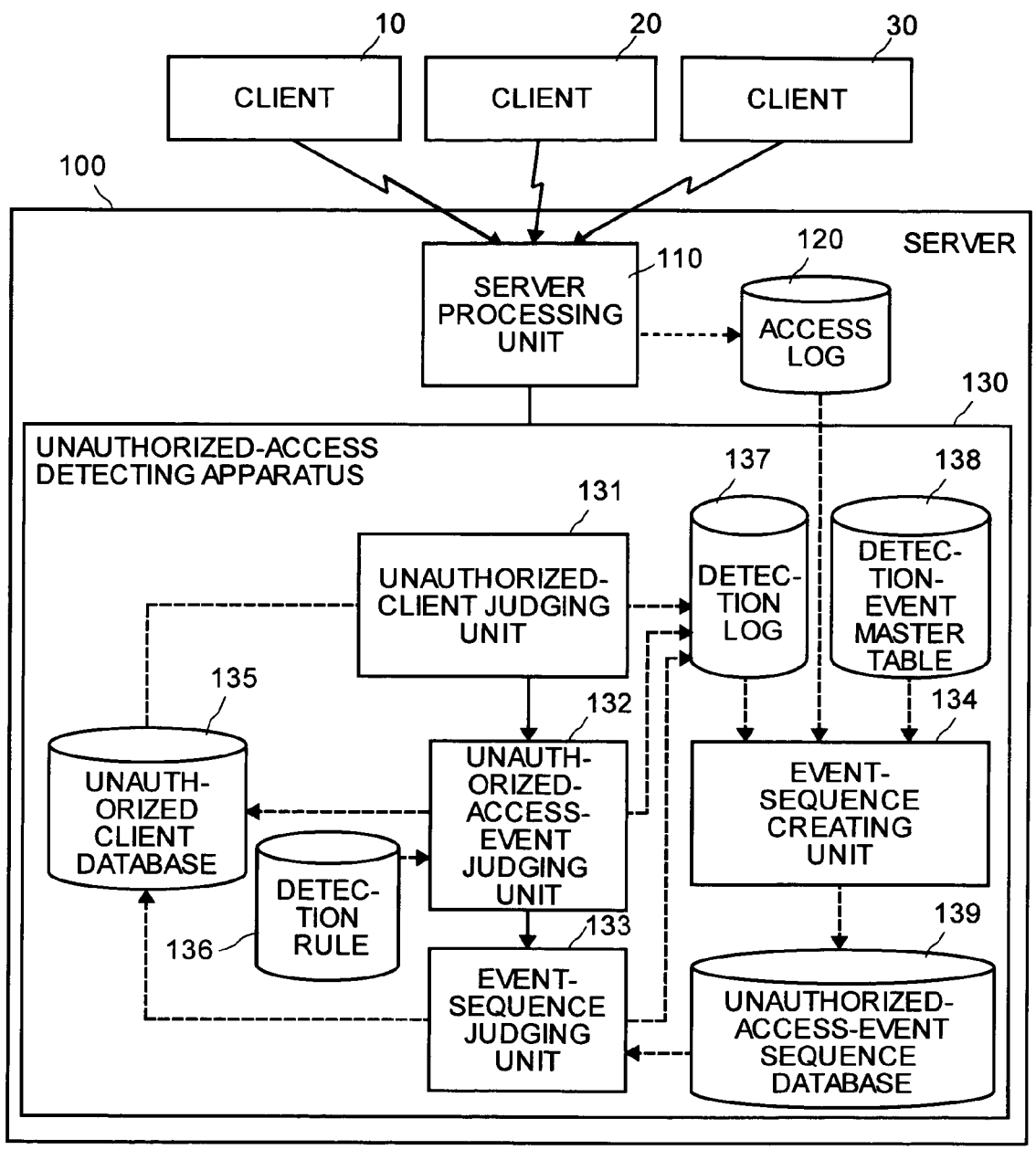
FIG. 1 is a block diagram for illustrating a configuration of a server according to a first embodiment of the present invention.

FIG. 1 is a block diagram of a server according to a first embodiment of the present invention. As shown, a server 100 is a computer that includes a server processing unit 110, an access log 120, and an unauthorized-access detecting unit 130, and provides services to clients 10 to 30 via the Internet. Although only three units of the clients 10 to 30 are shown for convenience in explanation, the server 100 is accessed from an arbitrary number of the client.

The server processing unit 110 is a processing unit that provides services in response to a process request from the clients 10 to 30, and that requests the unauthorized-access detecting unit 130 to judge whether the process request is authorized. When the process request is judged to be unauthorized, the server processing unit 110 does not provide the services.

The access log 120 is data that includes the process request from the clients 10 to 30. The access log 120 includes all the process requests and process results thereof regardless of the process request being authorized or unauthorized.

The unauthorized-access detecting unit 130 is a processing unit that detects unauthorized access to the server 100, and includes an unauthorized-client judging unit 131, an unauthorized-access-event judging unit 132, an event-sequence judging unit 133, an event-sequence creating unit 134, an unauthorized client database 135, a detection rule 136, a detection log 137, a detection-event master table 138, and an unauthorized-access-event sequence database 139.

The unauthorized-client judging unit 131 is a processing unit that detects the unauthorized access by comparing each of the clients 10 to 30, which accesses the server 100, with unauthorized clients that are registered in the unauthorized client database 135.

The unauthorized-access-event judging unit 132 is a processing unit that detects the unauthorized access by comparing the process request from the clients 10 to 30 to the server 100 with unauthorized process requests that are registered in the detection rule 136.

The event-sequence judging unit 133 is a processing unit that detects the unauthorized access by comparing a series of the process request from the clients 10 to 30 to the server 100 with unauthorized-access-event sequence that is registered in the unauthorized-access-event sequence database 139. This event-sequence judging unit 133 does not detect the unauthorized access only by judging from a single request of the process request individually, but detects the unauthorized access and a sign of attacks by checking a series of the process request from the clients 10 to 30 in a time series. In addition, the event-sequence judging unit 133 issues an attack forecast based on the sign of attacks detected.

The event-sequence creating unit 134 is a processing unit that creates the unauthorized-access-event sequence from the access log 120 and the detection log 137 in which the unauthorized access is recorded, and selects unauthorized-access-event sequence to be registered in the unauthorized-access-event sequence database 139 from among the unauthorized-access-event sequences created, by use of the detection-event master table 138.

In the unauthorized client database 135, the unauthorized client, which has made the unauthorized access before, is registered. In the unauthorized client database 135, an IP address, a client name, a date of registration to the unauthorized client database 135, and a date of last access to the server 100 are recorded per the unauthorized access. The date of last access to the server 100 is used to delete, from this unauthorized client database 135, the unauthorized client that has not accessed for a certain period.

FIG. 2 is a table for explaining an example of the unauthorized client database 135. The table indicates that a client with an IP address 1.2.3.4 was registered as an unauthorized client on 2001/1/1, and that the date of last access of this unauthorized client to the server 100 is 2001/1/10. Furthermore, the table indicates that another client with an IP address 111.222.111.222 and a client name a.b.c.or.jp was registered as an unauthorized client on 2000/11/13, and that the date of last access of this unauthorized client to the server 100 is 2001/1/12, meanwhile, still another client with an IP address 100.200.255.255 and a client name aaa.bbb.ccc.ne.jp was registered as an unauthorized client on 2000/7/18, and that the date of last access of this unauthorized client to the server 100 is 2000/11/13.

The detection rule 136 is a database to which the unauthorized process request is registered. In the detection rule 136, the unauthorized access is registered in unit of the process request. Therefore, the detection rule 136 is used to judge the unauthorized access based on only a single request of the process request. On the other hand, the unauthorized-access-event sequence database 139 is used to judge the unauthorized access based on more than one process request.

The detection log 137 is data that records about the unauthorized access when the unauthorized access is detected by the unauthorized-client judging unit 131, the unauthorized-access-event judging unit 132 or the event-sequence judging unit 133, and is data to create the unauthorized-access-event sequence database 139.

FIG. 3 is a table for explaining an example of the detection log 137. This detection log 137 includes an ID as a serial number, a date of unauthorized access, an event name that indicates a type of the unauthorized process request, a source port name, a target port name, a source that indicates the IP address of the unauthorized client, and a destination that indicates the IP address of the server 100 accessed. For example, the unauthorized access with a Ser. No. 175,006 occurred on 19 Sep. 2000, and the type of unauthorized process request thereof is SNMP_Community, the source port name is 923, the target port name is SNMP, the IP address of unauthorized client is 192.168.35.166, and the IP address of the server 100 accessed is 192.168.35.161.

The detection-event master table 138 includes each of the events that forms the unauthorized-access-event sequence, and is used when the event-sequence creating unit 134 creates the unauthorized-access-event sequence database 139. The event is the process request from the clients 10 to 30. The event can be formed with a single process request or with more than one process request.

The unauthorized-access-event sequence database 139 includes the unauthorized-access-event sequences. The unauthorized-access-event sequence database 139 enables to detect the unauthorized access more accurately, and to detect any sign of attack thereby making the server to be prepared for the future attack.

Figure 4:
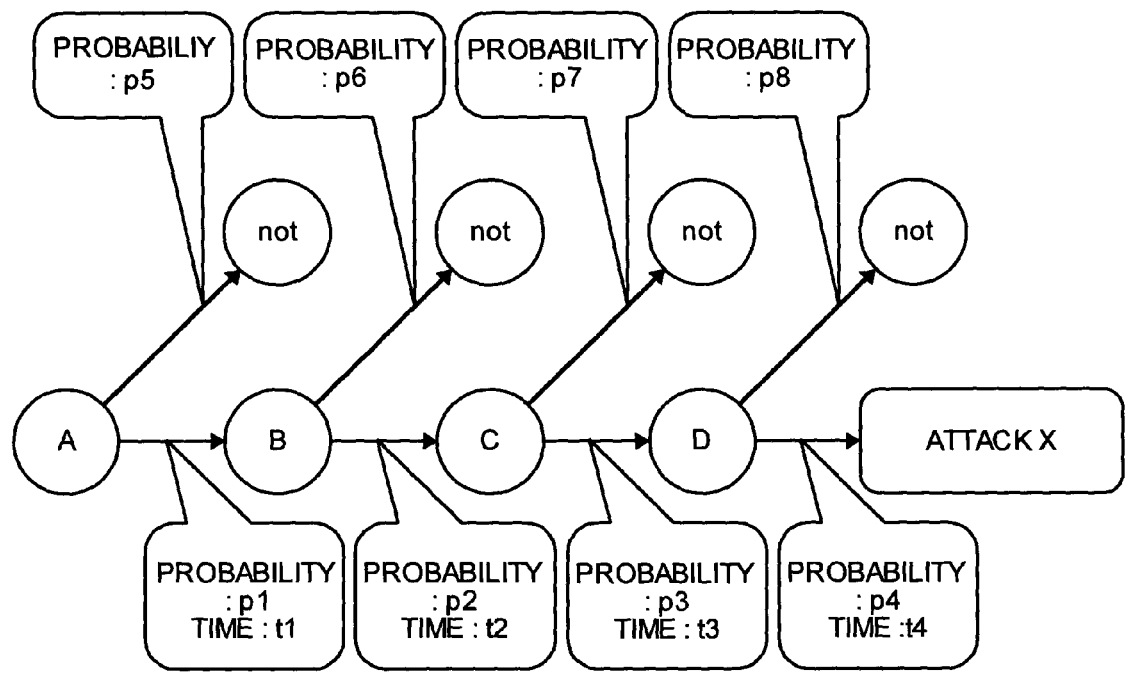
FIG. 4 is a schematic for explaining a concept of an unauthorized-access-event sequence.

FIG. 4 is a schematic for explaining a concept of the unauthorized-access-event sequence. As shown in FIG. 4, a procedure before reaching an attack X includes four events A, B, C, and D. An arrow indicates an event transition, and a probability indicates a transition probability in past cases. A time added to the arrow indicates a time interval between the events that are obtained based in past cases. For example, the transition probability from the event A to the event B is p1, and the time interval is t1. The time interval t1 is formed with an average time interval, a maximum time interval, and a maximum time interval in the past cases.

Moreover, the transition from the event A to an event "other than the event B" is shown by an arrow pointing from the event A to "not", and the transition probability thereof is p5. In this case, p1+p5 is 1. The transition from the event A to the event "other than the event B" is not the unauthorized access, and the time interval thereof has no meaning. Therefore, only the transition probability is shown. The transition probability p2 from the event B to the event C is the transition probability when the event A occurs before the event B. Therefore, the transition probability p2 is not simply the transition probability from the event B to the event C.

As mentioned above, the unauthorized-access-event sequence is formed as a probability model of the transition of the event, which occurs before reaching an attack, with certain conditions. For example, if there was a case in which a series of events such as a port scan, route authority acquisition, installation of a steppingstone by introduction of an unauthorized program, and sending UDPFlood by an attack command occurred in this order, and then a DDoS (Distributed Denial of Service) attack occurred, the transition of this series of events becomes the unauthorized-access-event sequence.

Figure 5:
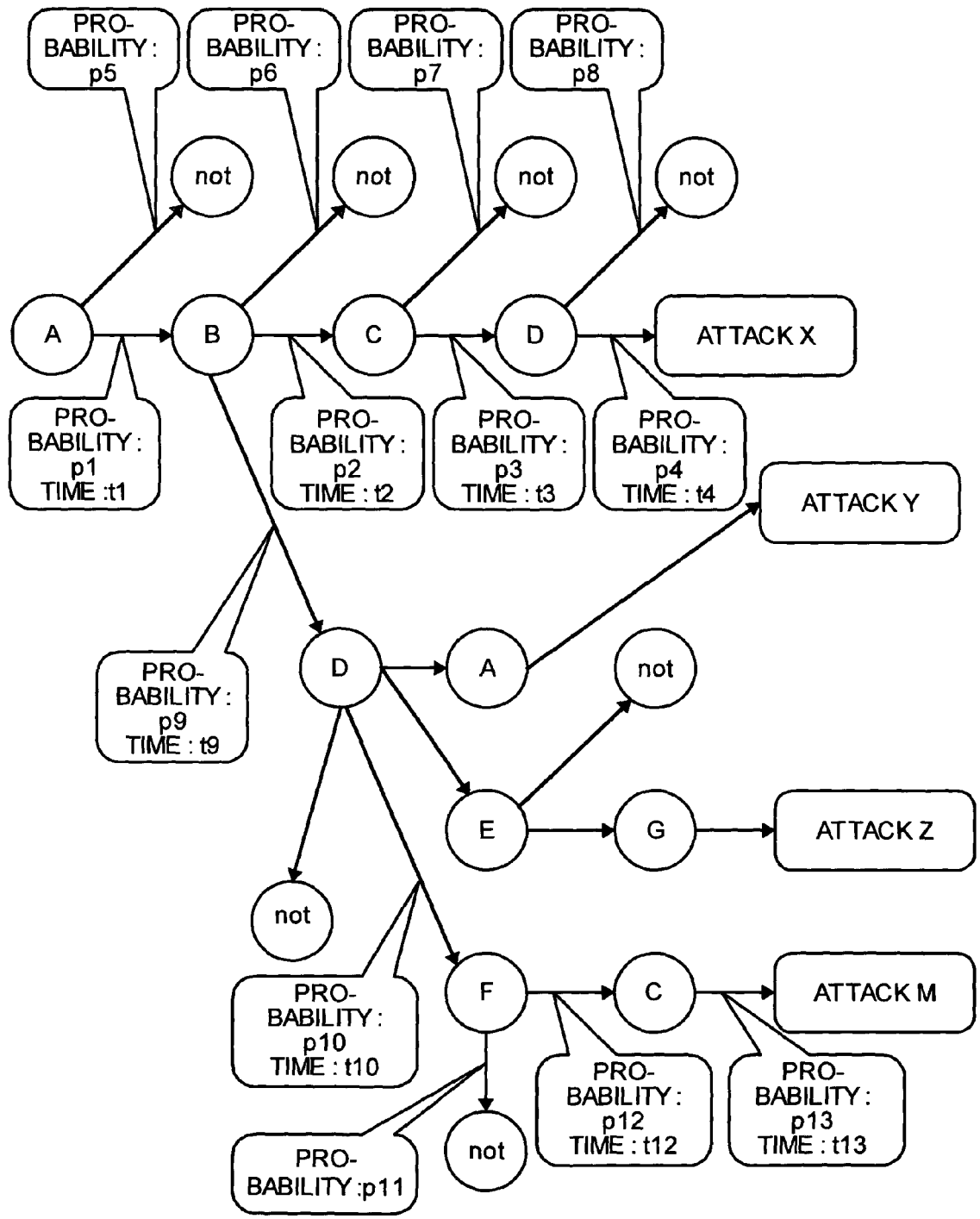
FIG. 5 is a schematic for illustrating an example of a structure of a sign detection rule.

Unauthorized access detection is performed using a sign detection rule in which a plurality of the unauthorized-access-event sequences are coupled. FIG. 5 is a diagram that explains an example of a structure of a sign detection rule. As shown in FIG. 5, this sign detection rule is formed in a tree structure in which the unauthorized-access-event sequences are coupled with respect to a common event. For example, in a children including A→B→D, three unauthorized-access-event sequences, A→B→D→A→attack Y, A→B→D→E→G→attack Z, and A→B→D→F→C→attack M are merged. The sign detection rule enables to detect the unauthorized access that includes more than one unauthorized-access-event sequence, which cannot be detected by the unauthorized access detection using an individual unauthorized-access-event sequence as an independent rule.

Furthermore, in this unauthorized access detection, it is possible to monitor a newly occurring event to detect a current stage until an attack by comparing with the sign detection rule, and to estimate the time until the attack occurs and the probability of occurrence of the attack using the transition probability and the transition time of each of the transition ahead. For example, at a stage in which the event F occurs, the time until the occurrence of the attack M is estimated to be t12+t13, and the probability thereof is estimated to be p12× p13.

In comparing with this sign detection rule, it is judged as the sign of the attack when the events occurring matches with three events in the sign detection rule. However, each of factors, the number of the events left until the attack, the time interval until the attack, the transition probability until the attack, and a degree of significance of the attack forecasted, or a combination of these factors may be standards of judgment.

Figure 6:
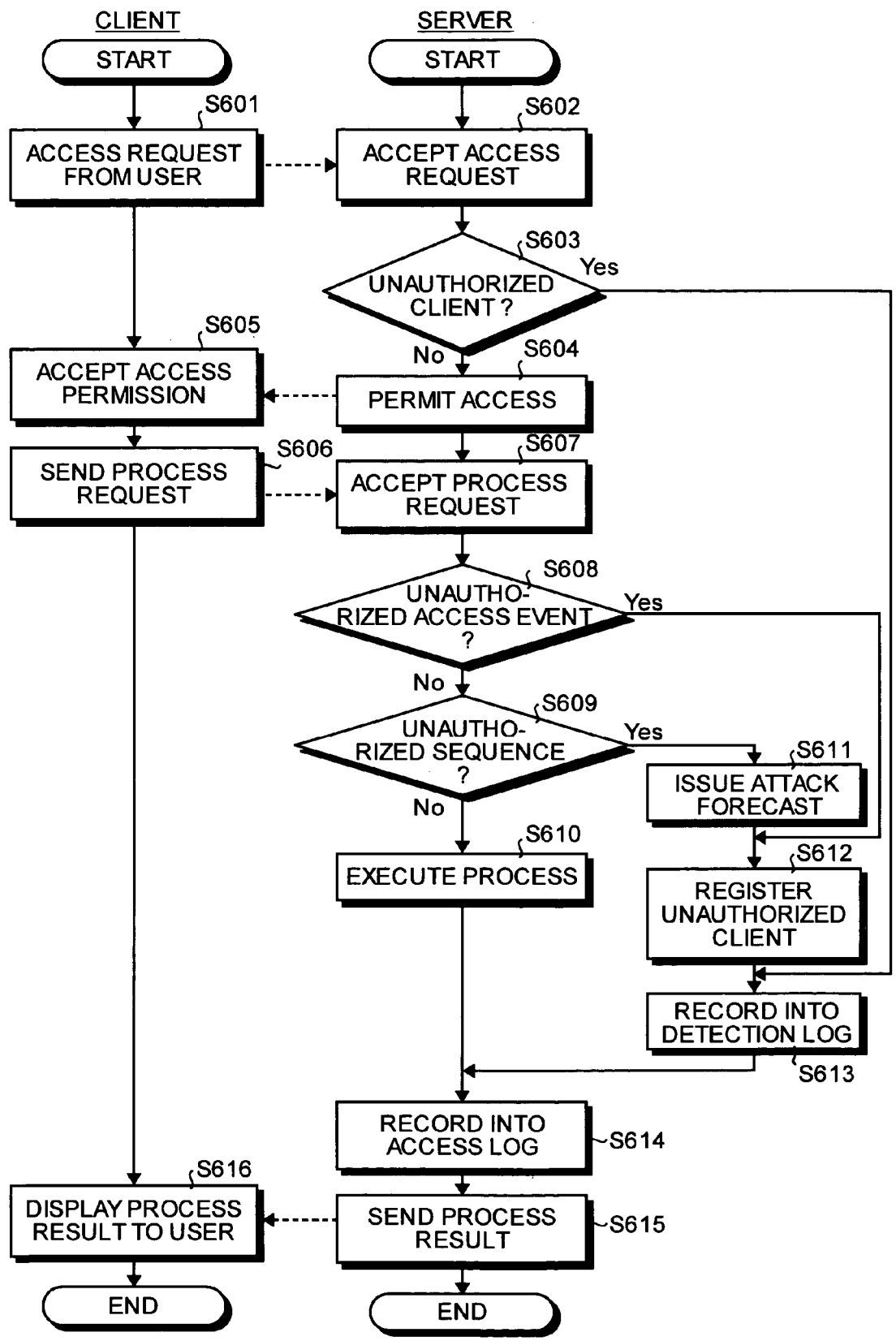
FIG. 6 is a flowchart of unauthorized access detection of the server according to the first embodiment.

FIG. 6 is a flowchart of the unauthorized access detection in the server 100 according to the first embodiment. While a case in which a user makes an access request to the server 100 from the client 10 is explained, the action in cases in which the access request is made from the clients 20 and 30 is same as the case above.

As shown, when the user makes the access request to the server 100 from the client 10 (step S601), the server processing unit 110 accepts the access request (step S602), and requests the unauthorized-access detecting unit 130 to judge whether this access is authorized or unauthorized. The unauthorized-access detecting unit 130, which is requested, checks whether the client 10, which has requested this access, is registered as an unauthorized client in the unauthorized client database 135 (step S603). If the client 10 is not registered as an unauthorized client, the server processing unit 110 permits the client 10 to access the server (step S604), and the client 10 that has thus acquired access permission sends a series of process requests in succession to the server 100 (steps S605 to S606).

Then, the server processing unit 110 accepts each of the process requests (step S607), and requests the unauthorized-access detecting unit 130 to judge whether each of the process requests is an unauthorized process request. The unauthorized-access detecting unit 130, which is requested, checks whether each of the process requests is registered as an unauthorized access event in the detection rule 136 (step S608). If the process request is not registered as an unauthorized access event, the unauthorized-access detecting unit 130 compares event sequence based on the process requests, which have been made by the client 10, and the unauthorized-access-event sequence registered in the unauthorized-access-event sequence database 139 (step S609). If the event sequence does not correspond with the unauthorized-access-event sequence, the server processing unit 110 performs requested processes regarding the process requests as authorized process requests (step S610). The server processing unit 110 records the event sequence in the access log 120 (step S614), and sends a process result to the clients 10 (step S615).

On the other hand, if the event sequence corresponds with the unauthorized-access-event sequence, this client 10 is judged as an attacker, an attack forecast that includes information such as the IP address of the client 10, the time until an attack, which is estimated, (a minimum value, an average value, and a maximum value), a type of the attack, a probability of occurrence of the attack, and a significance degree of the attack is issued (step S611). This client 10 is registered as an unauthorized client in the unauthorized client database 135 (step S612), and recorded in the detection log 137 (step S613). The process result is made as the "unauthorized access", and the procedure goes on to the step S614.

If it is judged as an unauthorized access event (step S608 Yes), the process result is made as the "unauthorized access", and the procedure goes on to the step S612, and if it is judged as an unauthorized client (step S603 Yes), the process result is made as the "unauthorized access", and the procedure goes on to the step S613. The client 10 receives the process result, and displays the process result received to the user (step S616).

Figure 7:
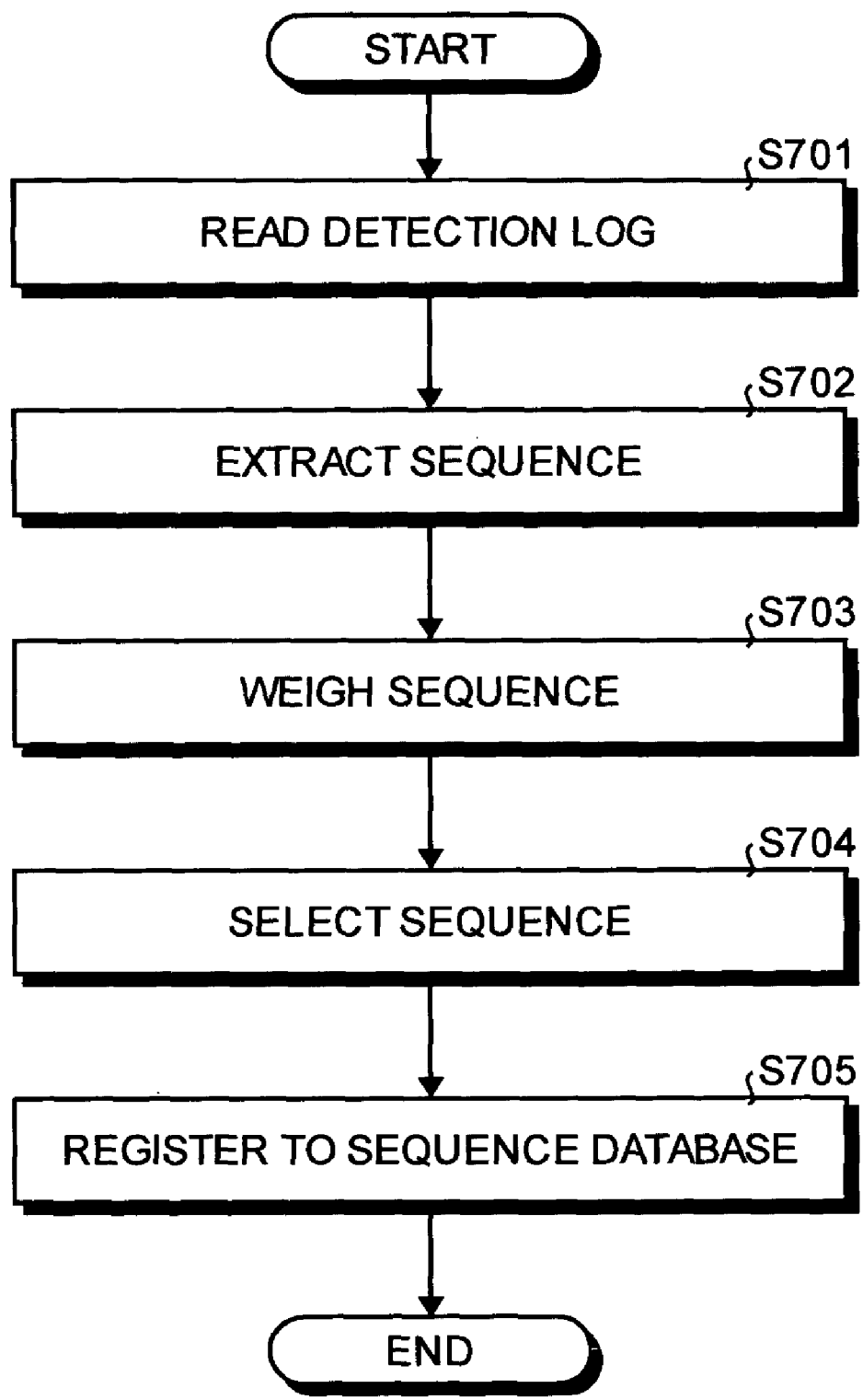
FIG. 7 is a flowchart of a procedure in an event-sequence creating unit shown in FIG. 1.

FIG. 7 is a flowchart of a procedure in the event-sequence creating unit 134 shown in FIG. 1. As shown in FIG. 7, the event-sequence creating unit 134 reads the access log 120 and the detection log 137 (step S701). For each of the unauthorized access registered in the detection log 137, the event-sequence creating unit 134 extracts a series of the process requests from the client as the unauthorized-access-event sequence (step S702). The access log 120 to be a subject of this unauthorized-access-event sequence extraction is limited to a part related to a certain attack. Concretely, it is limited to the access log 120 in a certain period (for example, the access log for one day) prior to the occurrence of an attack to be detected. However, with regard to such an attack that makes the server 100 inoperative, the period should be long to detect such attack as early as possible.

Then, weighing is carried out to the extracted unauthorized-access-event sequence by use of the detection-event master table 138 (step S703). This detection-event master table 138 is a table in which the degree of significance of each of the events is defined in advance as weight. By calculating this weight, weighing the unauthorized-access-event sequence is carried out.

FIG. 8 is a table for explaining an example of the detection-event master table 138. As shown in FIG. 8, this detection-event master table 138 includes an event number that indicates a serial number of the event, an event name that indicates a name of the event, and a degree of significance that defines the weight of the event that are arranged per event. For example, the weight of an event named Arp of which the event number is 1 is defined as 10, meanwhile, the weight of an event named BackOrifice of which the event number is 2 is defined as 7.

Then, based on a weighing result, the unauthorized-access-event sequence is selected (step S704), and is registered in the unauthorized-access-event sequence database 139 as a sign detection rule (step S705). In this selection of the unauthorized-access-event sequences, the unauthorized-access-event sequence with a large weight is submitted to an expert, and the selection is made under instructions by the expert. The instructions by the expert enables to further reliably select the unauthorized-access-event sequence.

As described above, in the first embodiment, the unauthorized access is detected not only from a single one of the process request, but the unauthorized access is detected also from more than one of the process request by use of the unauthorized-access-event sequence database 139. Therefore, it is possible to detect the unauthorized accesses more accurately, and to detect the sign of the attack thereby making the server to be prepared for the future attack.

In the first embodiment, the unauthorized client database 135 and the unauthorized-access-event sequence database 139 are formed based on the unauthorized access, which occurred in past, to the server 100. These databases may be used as databases independent from the server 100. Therefore, these databases may be formed based on the unauthorized access to more than one of the server, and may be shared by the servers.

Second Embodiment

In the first embodiment, a case in which the apparatus for detecting unauthorized access is arranged in the server 100 has been explained. However, the present invention is not limited to this case, and the apparatus may be arranged in a computer network. Thus, it becomes possible to detect the unauthorized access to more than one of the server connected to the computer network.

FIG. 9 is a block diagram of a configuration of an unauthorized-access detecting system according to a second embodiment. As shown in FIG. 9, the unauthorized-access detecting system includes a router 40, servers 50 to 70, an apparatus for detecting unauthorized access 80, and a LAN 90 that connects these devices, and detects the unauthorized access from the clients 10 to 30 via the Internet to the servers 50 to 70. Although only three units of the clients 10 to 30 and three units of servers 50 to 70 are shown for convenience in explanation, an arbitrary number of the clients and servers may be used. In addition, like reference characters are given to like components that function same as the components shown in FIG. 1, and detailed explanations of such components are omitted.

The router 40 is to connect computer networks mutually, and the router 40 connects the Internet and the LAN 90 in the present embodiment.

The router 40 can shut out packets that correspond to the process requests from the unauthorized clients in cooperation with the apparatus for detecting unauthorized access 80.

The servers 50 to 70 are computers that provide services to the clients 10 to 30 via the Internet, and have unauthorized-access handling units 52 to 72 that cope with the unauthorized access in cooperation with access logs 51 to 71 and the apparatus for detecting unauthorized access 80.

The apparatus for detecting unauthorized access 80 monitors traffics that flow on the LAN 90 to detect the unauthorized access to the servers 50 to 70. The apparatus for detecting unauthorized access 80 includes an unauthorized-client judging unit 81, an unauthorized-access-event judging unit 82, an event sequence judging unit 83, an unauthorized client database 135, a detection rule 136, a detection log 137, an unauthorized-access-event sequence database 139, a LAN interface unit 84, and a countermeasure instructing unit 85.

The unauthorized-client judging unit 81, the unauthorized-access-event judging unit 82, and the event sequence judging unit 83 are processing units that perform same roles as those of the unauthorized-client judging unit 131, the unauthorized-access-event judging unit 132, and the event-sequence judging unit 133 respectively, but when the unauthorized access is detected, a request for a countermeasure is made to the countermeasure instructing unit 85 instead of the server processing unit 110.

The LAN interface unit 84 is a processing unit that captures the packets flowing on the LAN 90, and requests the unauthorized-client judging unit 81 to detect unauthorized accesses. In addition, the LAN interface unit 84 sends, to the router 40 and the servers 50 to 70, instructions to cope with the unauthorized access based on instructions from the countermeasure instructing unit 85.

The countermeasure instructing unit 85 instructs the router 40 and the servers 50 to 70 to take the countermeasure against the unauthorized access when the unauthorized-client judging unit 81, the unauthorized-access-event judging unit 82, and the event sequence judging unit 83 detect the unauthorized access.

As mentioned above, in the second embodiment, the LAN interface unit 84 captures the packets flowing on the LAN 90, and the unauthorized-client judging unit 81, the unauthorized-access-event judging unit 82, and the event sequence judging unit 83 detect the unauthorized access in the packets. When the unauthorized access is detected, the countermeasure instructing unit 85 instructs the router 40 and the servers 50 to 70 to take the countermeasure against the unauthorized access. Thus, it is possible to accurately detect the unauthorized access to the servers 50 to 70, and also to detect the sign of the attack, thereby making the router 40 and the servers 50 to 70 to be prepared for the future attacks.

As explained, according to the present invention, a series of process requests from an unauthorized client to a server preceding a fraudulent act is recorded as an unauthorized-access-event string. When a series of the process requests by a client corresponds with the unauthorized access event string recorded, the process requests are judged as the unauthorized access. Consequently, it is possible to accurately detect the unauthorized access, and also to detect any sign of an attack, thereby making the server to be prepared for future attacks.

Industrial Applicability

As explained above, an apparatus, a computer program, and a method for detecting unauthorized access according to the present invention are suitable for a server system that is required to appropriately cope with unauthorized access to a server that provides a service via a computer network, and to provide highly reliable services.

The invention claimed is:

1. An unauthorized-access detecting apparatus that detects unauthorized access to a server that provides a service via a network, the unauthorized-access detecting apparatus comprising:
   a storing unit that stores an unauthorized-access event string including a series of process requests made by an unauthorized user in past times, and a transition probability and a time interval between two consecutive process requests included in the unauthorized-access event string;
   a receiving unit that receives a process request from a user; and
   a judging unit that judges whether an unauthorized access occurs or not by comparing the unauthorized-access event string stored in the storing unit with an event string including a series of process requests received by the receiving unit, and, when it is determined that the event string matches with at least a portion of the unauthorized-access event string, estimates an occurrence time of the unauthorized access by adding time intervals between process requests included in the unauthorized-access event string and estimates a probability of an occurrence of the unauthorized access by multiplying transition probabilities between process requests included in the unauthorized-access event string.

2. The unauthorized-access detecting apparatus according to claim 1, further comprising a notifying unit to forecast an attack by a user based on results of the adding and multiplying performed by the judging unit, and notifies the attack forecasted and a countermeasure against the attack.

3. The unauthorized-access detecting apparatus according to claim 1, further comprising:
an unauthorized-client storing unit to store a client that made the process request of the unauthorized access as an unauthorized client; and
an unauthorized-client rejecting unit to reject the process request from the unauthorized client stored in the unauthorized-client storing unit.

4. The unauthorized-access detecting apparatus according to claim 1, wherein
an event includes either of a single process request and a plurality of process requests, and
the unauthorized-access event string includes a plurality of the events.

5. The unauthorized-access detecting apparatus according to claim 4, wherein
the storing unit to further store an unauthorized-access event tree that branches according to the transition probability between the events including respective process requests made by an unauthorized user, and
the judging unit to further compare the past series of process requests with the unauthorized-access event tree.

6. The unauthorized-access detecting apparatus according to claim 4, further comprising:
a data storing unit to store unauthorized-access data that relates to the unauthorized access;
a history storing unit to store all the process requests to the server as a process history; and
a creating unit to create the unauthorized-access event string using the unauthorized-access data and the process history.

7. The unauthorized-access detecting apparatus according to claim 6, further comprising an access-event master table that contains a degree of significance of the event predefined for each of the events, wherein
the creating unit to further create the unauthorized-access event string based on the degree of significance of the event.

8. An unauthorized-access detecting method comprising:
storing an unauthorized-access event string including a series of process requests made by an unauthorized user in past times, and a transition probability and a time interval between two consecutive process requests included in the unauthorized-access event string;
receiving a process request from a user;
judging whether an unauthorized access occurs or not by comparing the unauthorized-access event string stored, with an event string including a series of process requests received from the user;
estimating, when it is determined that the event string matches with at least a portion of the unauthorized-access event string, a probability of an occurrence of the unauthorized access by multiplying a plurality of transition probabilities between process requests included in the unauthorized-access event string; and
estimating, when it is determined that the event string matches with at least a portion of the unauthorized-access event string, an occurrence time of the unauthorized access by adding together a plurality of time intervals between process requests included in the unauthorized-access event string.

9. The unauthorized-access detecting method according to claim 8, further comprising forecasting an attack by a user based on the probability of and the time until the occurrence of the fraudulent act estimated; and
notifying the attack forecasted and a countermeasure against the attack.

10. The unauthorized-access detecting method according to claim 8, further comprising
storing a client that made the process request of the unauthorized access as an unauthorized client; and
rejecting the process request from the unauthorized client stored.

11. The unauthorized-access detecting method according to claim 8, wherein
an event includes either of a single process request and a plurality of process requests, and
the unauthorized-access event string includes a plurality of the events.

12. The unauthorized-access detecting method according to claim 11, wherein
the storing includes storing an unauthorized-access event tree that branches according to the transition probability between the events including respective process requests made by a user that is unauthorized; and
the comparing includes comparing the past series of process requests with the unauthorized-access event tree.

13. The unauthorized-access detecting method according to claim 11, further comprising
storing unauthorized-access data that relates to the unauthorized access;
storing all the process requests to the server as a process history; and
creating the unauthorized-access event string using the unauthorized-access data and the process history.

14. The unauthorized-access detecting method according to claim 13, wherein the creating includes creating the unauthorized-access event string based on a degree of significance of the event.

15. A non-transitory computer-readable recording medium that stores a computer program for detecting an unauthorized-access, the computer program makes the computer execute:
storing an unauthorized-access event string including a series of process requests made by an unauthorized user in past times, and a transition probability and a time interval between two consecutive process requests included in the unauthorized-access event string; receiving a process request from a user; judging whether an unauthorized access occurs or not by comparing the unauthorized-access event string stored, with an event string including a series of process requests received from the user; estimating, when it is determined that the event string matches with at least a portion of the unauthorized-access event string, a probability of an occurrence of the unauthorized access by multiplying a plurality of transition probabilities between process requests included in the unauthorized-access event string; and estimating, when it is determined that the event string matches with at least a portion of the unauthorized-access event string, an occurrence time of the unauthorized access by adding together a plurality of time intervals between process requests included in the unauthorized-access event string.

16. The non-transitory computer-readable recording medium according to claim 15, wherein the computer program further makes the computer execute forecasting an attack by a user based on the probability of and the time until the occurrence of the fraudulent act estimated; and notifying the attack forecasted and a countermeasure against the attack.

17. The non-transitory computer-readable recording medium according to claim 15, wherein the computer program further makes the computer execute storing a client that made the process request of the unauthorized access as an unauthorized client; and rejecting the process request from the unauthorized client stored.

18. The non-transitory computer-readable recording medium according to claim 15, wherein an event includes either of a single process request and a plurality of process requests, and the unauthorized-access event string includes a plurality of the events.

19. The non-transitory computer-readable recording medium according to claim 18, wherein the storing includes storing an unauthorized-access event tree that branches according to the transition probability between the events including respective process requests made by a user that is unauthorized; and the comparing includes comparing the past series of process requests with the unauthorized-access event tree.

20. The non-transitory computer-readable recording medium according to claim 18, wherein the computer program further makes the computer execute storing unauthorized-access data that relates to the unauthorized access; storing all the process requests to the server as a process history; and creating the unauthorized-access event string using the unauthorized-access data and the process history.

21. The non-transitory computer-readable recording medium according to claim 20, wherein the creating includes creating the unauthorized-access event string based on a degree of significance of the event.

* * * * *